(12) United States Patent
Ehninger et al.

(10) Patent No.: US 11,618,102 B2
(45) Date of Patent: Apr. 4, 2023

(54) METHOD FOR MANUFACTURING A DOMESTIC APPLIANCE

(71) Applicant: ELECTROLUX APPLIANCES AKTIEBOLAG, Stockholm (SE)

(72) Inventors: Christian Ehninger, Rothenberg ob der Tauber (DE); Richard Wiesinger, Rothenberg ob der Tauber (DE); Marco Böckler, Rothenberg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 933 days.

(21) Appl. No.: 16/467,119

(22) PCT Filed: Dec. 1, 2017

(86) PCT No.: PCT/EP2017/081205
§ 371 (c)(1),
(2) Date: Jun. 6, 2019

(87) PCT Pub. No.: WO2018/114290
PCT Pub. Date: Jun. 28, 2018

(65) Prior Publication Data
US 2020/0189033 A1 Jun. 18, 2020

(30) Foreign Application Priority Data

Dec. 20, 2016 (EP) .................................. 16205561

(51) Int. Cl.
*B23K 26/21* (2014.01)
*B23K 26/044* (2014.01)
(Continued)

(52) U.S. Cl.
CPC .............. *B23K 26/21* (2015.10); *B23K 13/01* (2013.01); *B23K 26/032* (2013.01);
(Continued)

(58) Field of Classification Search
CPC .... B23K 13/01; B23K 26/032; B23K 26/044; B23K 26/046; B23K 26/082; B23K 26/0869; B23K 26/21
(Continued)

(56) References Cited

U.S. PATENT DOCUMENTS

2014/0175068 A1* 6/2014 Poss ....................... B23K 26/20
219/121.64

FOREIGN PATENT DOCUMENTS

CN 103358023 A 10/2013
DE 10163183 7/2003
(Continued)

OTHER PUBLICATIONS

Translation of Cited CN 103358023 (Year: 2013).*
(Continued)

*Primary Examiner* — Dana Ross
*Assistant Examiner* — Joseph W Iskra
(74) *Attorney, Agent, or Firm* — Pearne & Gordon LLP

(57) ABSTRACT

The present invention relates to a method for manufacturing a domestic appliance at least comprising the following steps:—at least one positioning and/or prefixing step comprising positioning and/or prefixing of at least a first component part (3) of the domestic appliance relative to at least a second component part (2) of the domestic appliance, the first component part (3) comprising a first contour (32), and the second component (2) part comprising a matching second contour (21), respectively, the positioning and/or prefixing comprising positioning and/or prefixing the second contour (21) in a pre-defined arrangement at the first contour (32);—at least one welding step comprising welding together the first and second component parts (3, 2) along at least one of the first and second contour (32, 21); wherein the welding being controlled by a control device and carried out
(Continued)

by:—detecting, in particular via a detection device, at least one of a location and course of at least a section of a marking representative for only one of the first and second contour; and—generating a welded seam to join the first and second component along the first and second contour based on the detected location and/or course of the marking.

20 Claims, 5 Drawing Sheets

(51) Int. Cl.
*B23K 26/082* (2014.01)
*B23K 13/01* (2006.01)
*B23K 26/03* (2006.01)
*B23K 26/046* (2014.01)
*B23K 26/08* (2014.01)

(52) U.S. Cl.
CPC .......... *B23K 26/044* (2015.10); *B23K 26/046* (2013.01); *B23K 26/082* (2015.10); *B23K 26/0869* (2013.01)

(58) Field of Classification Search
USPC ........................................................ 228/103
See application file for complete search history.

(56) References Cited

FOREIGN PATENT DOCUMENTS

| DE | 102004043076 A1 | 4/2005 |
| DE | 102007008772 A1 | 6/2008 |
| DE | 102013114099 | 6/2014 |
| EP | 2436986 * | 4/2012 |
| EP | 2840321 A1 | 2/2015 |

OTHER PUBLICATIONS

Translation of Cited DE102007008772 (Year: 2008).*
European communication for application No. EP 16205561.0 dated Jul. 15, 2021, 7 pages.
International Search Report and Written Opinion in PCT/EP2017/081205 dated Feb. 20, 2018, 11 pages.
Translation of Chinese Office action for application No. 201780078106.5 dated Jul. 5, 2022, 7 pages.

* cited by examiner

METHOD FOR MANUFACTURING A DOMESTIC APPLIANCE

The present invention relates to methods for manufacturing of domestic appliances.

The document EP 2 436 986 A1 discloses an oven muffle with a welding connection. The oven muffle comprises a first metal sheet part and a second metal sheet part which are arranged in an overlapping manner relative to each other. One of the sheet metal parts comprises an S-like or Z-like displacement portion. The front end of the second sheet metal part is arranged adjacent to a transition surface of the S-like or Z-like displacement portion. The metal sheet parts may be welded together in the region of the joint of transition surface and front end of the respective sheet metal parts, wherein it is possible that the joint itself forms or is a part of the welding seam.

Document EP 1 640 101 B1 describes a device and method of controlling a processing head of a manufacturing machine, wherein the processing head is controlled along a linear workpiece structure, such as the edge of a workpiece, by using an optical detection system for detecting a distance between a machining line generated by the processing head and the linear workpiece structure. The method and device may for example be used for applying adhesive beads to a workpiece.

It is an object of the present invention to provide an advantageous method for manufacturing a domestic appliance. In particular, it is an object of the present invention to provide an advantageous method for joining component parts, in particular sheet-like parts or sections, of domestic appliances, more particularly, for welding chambers or cavities (or parts thereof) used for oven muffles, treatment chambers or the like.

The object of the invention is achieved by a method for manufacturing a domestic appliance at least comprising the following steps:
  at least one positioning and/or prefixing step comprising positioning and/or prefixing of at least first component part of the domestic appliance relative to at least a second component part of the domestic appliance, the first component part comprising a first contour, and the second component part comprising a matching second contour, respectively, the positioning and/or prefixing comprising positioning and/or prefixing the second contour in a pre-defined arrangement at, in particular in a pre-defined alignment with, the first contour;
  at least one welding step comprising welding, in particular laser welding, together the first and second component parts along at least one of the first and second contour; wherein the welding being controlled by a control device and carried out by:
  detecting, in particular via a detection device, at least one of a location and course of at least a section of a marking representative for only one of the first and second contour; and
  generating a welded, in particular laser-welded, seam to join the first and second component along the first and second contour based on the detected location and/or course of the marking.

The first and second component parts may for example be parts made from metal and/or plastic, for example in sheet-like form. The welding step may for example comprise welding together a first and second metal or plastic sheet or part along mutually matching contours. Therefore, the proposed method may be considered as comprising a method of welding together two component parts of a domestic appliance.

At least one of the first or second contour may in embodiments for example be a kink, bend, buckling, bead, rip, embossing, and/or inclined or bent surface provided on or in the first or second component part, for example a metal or plastic sheet.

Positioning the first component part relative to the second component part may involve positioning the second component part at the first component part, such that the second contour, e.g. an end face of the second component, is aligned with the first contour, or the other way round. In particular, the step of positioning and/or prefixing may involve placing the first and second component part relative to each other such that the course of the second contour follows the course of the first contour. Placing the first component part and second component part relative to each other may involve abutting the two component parts against each other such that they at least partially overlap. In the mutual aligned state, e.g. when the first and second contour are positioned relative to each other as described herein, the first and second contour may be located in the region of overlap.

In embodiments, in which the component parts form, in the assembled state, a type of cavity, for example an oven cavity or other, the contour to be detected may represent a contour that is accessible, in particular detectible, more particularly visible, from the side defining the outer side of the cavity.

In more general terms, in case that the component parts to be welded together may be classified as having a first side, e.g. an inner side, and a second side, e.g. an outer side, the second component part, i.e. the second contour, may be positioned relative to the first contour at the second side of the first component part, wherein detecting the marking, representative for example of the first contour, may be carried out with regard to or from the first side, and wherein generating the welded seam may involve impinging or applying laser energy to the first side of the first component part in the region of the first contour such that the second component part is connected by a welded seam along at least a section of the second contour at the second side of the first component part. Or in other words, the welding energy may be applied at or from the first side of the first component part such that the second component part located at the second side of the first component part is welded by a welded seam generated by the applied laser energy to the second side of the first component part, wherein the second side is averted from the first side, and the first contour is detected at the first side of the first component and used for controlling the path of the laser spot on the first side of the first component part, along the first contour as available at the first side.

In a set-up for welding together two component parts of a household appliance as proposed by the underlying invention, a second component part may be welded to a first component part along or in the region of a second contour that is in proper alignment with a first contour of the first component part, the welding carried out at a first side averted from a second side where the second component part and second contour are located. In this set-up, the second side may be considered as being hidden with regard to applying the laser energy and guiding the laser spot over the first component part along with or in accordance with the detected first contour. Therefore, the welding seam generated at the second contour located at the second side of the first component part by applying laser energy to the first side of the first component part may be designated a hidden welding joint, e.g. a hidden butt joint.

In particular, the steps of detecting the contour that is used for guiding the laser spot along one of the components, and applying the laser energy may be carried out with respect to the same side of the respective component part, whereas the respective other component part to be connected to the component part by a welded seam may be located at the other, averted side.

Therefore, with the proposed method, it is possible to weld together a first and a second component part of a household appliance, wherein it may be sufficient to be able to detect a contour or marking on a first side of a first component part so as to generate a welded seam with a second component part located on the averted second side, i.e. the side that is hidden with respect to a plan view of the first side. Thus, welded seams interconnecting mutually abutting and/or overlapping component parts may be generated by the use of suitable markings/contours from one single side, without requiring the other component part located at the averted side to be visible from this side. Therefore, the manufacturing process for for example oven cavities may be facilitated, because, all welding steps for interconnecting oven muffle walls may be carried out from the outer side of the cavity, the proposed method requiring to have a particular marking at the outer side that is representative for the location of the second component part, i.e. the second contour, and that can be detected from the first side, for example by optical means.

The first and second contour may comprise one or more of at least one linear and at least one curved section. For example, the first and second contour may comprise one or more linear sections and/or one or more circular sections, having for example one of more common points of intersection. The course of the one or more linear and/or curved sections may for example be parallel, inclined, and/or relate to different spatial directions on the component parts. The first and second contour may for example be congruent, such that they can be positioned with each other in parallel alignment, for example.

In embodiments, the first or second contour may be used as the marking, wherein a detection device may be used to detect the position (in particular: location and/or course) of the first or second contour. The welding, i.e. the generation of a welding seam or joint, may be conducted along the marking based on the detected position of the marking. For example, the marking or contour on the first component part may be detected by an optical detection system, and a laser spot of a laser device may be controlled and moved along the detected marking or contour at a first side of the first component part, the first side corresponding to the side where the first contour has been detected. Laser energy may be applied to and along the marking, wherein the applied laser energy may be selected in such a way that the second component part that is aligned with the second contour at the first contour and located at the averted side is welded by a welded seam to the first component part. The welded seam may be provided all along the first and second contour, or the welded seam may occupy only a section of the first and second contour.

In embodiments, the first or second contour may be or at least comprise an S-shaped or Z-shaped section having a first and second leg and an interconnecting diagonal or interconnecting stepped section. The first or second contour may for example be a buckling, such as a buckling having an S-shaped or Z-shaped cross section. The corresponding shape may be determined in cutting planes oriented perpendicular to the contour and parallel to the surface normal of a corresponding component part at the contour.

The respective other contour may be or relate to an end face of the corresponding component part, for example of a sheet-type component part. In particular in such cases, the end face may be positioned relative to the S-shaped or Z-shaped section to obtain a hidden butt-joint in which the end face abuts the region of the diagonal of the S-shaped or Z-shaped section, substantially flush with a first leg, while a second leg of the S-shaped or Z-shaped section overlaps with the component part comprising the face side. In such examples, the leg of the S-shaped or Z-shaped section may constitute a region of overlap in which the first and second component parts overlap. Detection of the contour may involve detection of S-shaped or Z-shaped section at a side where only one of the mutually aligned contours is visible. With the proposed method, visibility of only one of the contours is sufficient for properly carrying out the welding process, at least because by detecting the contour implicitly reveals the course of the other contour, due to the properly positioned and aligned component parts.

In embodiments, the first and second contour may relate to end faces of both the first and second component part, wherein welding the first and second component together may result in a hidden butt joint fixing together the first and second component part, for example positioned at each other in an essentially flush arrangement. Here the method involves generating the welded connection by detecting only one marking representative for either the first or the second contour, wherein at least a section of the not detected contour is hidden with respect to a plan view related to the side comprising the detected contour.

At least one of the first or second contours may in embodiments provided at least in parts on and along the component part at a particular distance from an edge of the component part.

For example, and as already stated, the first contour may be an S-shaped or Z-shaped buckling on the first component part, and the second contour may be an end face of the second component part. Positioning and/or prefixing of the first and second component part relative to each other may involve positioning the end face at a first side of the first component part so as to run flush with and along the buckling, in particular so as to abut the buckling and to run in parallel to the buckling. The first side may be or relate to an inner side of the component part, for example facing an inner volume of the component part in the fully assembled state.

In embodiments as mentioned above, the welding step may comprise detecting, using the first contour available at a second side averted from the first side, for example an outer side, of the first component as the marking, the location and/or course (in particular: position) of the buckling at the second, for example outer, side, and applying the welding, in particular the welding energy, for welding together the first and second component at or from the second side. The procedure may be reversed with regard to the first and second side, or first and second component. As has been described, the method advantageously allows interconnecting of component parts for household appliances where from the point of view of applying laser energy, only one of the components and a corresponding contour along which the welding shall be provided is visible or accessible, whilst the other component to be connected by welding needs not be visible, at least in a region where a welding seam is generated based on the visible and detected contour.

By welding together the first and second component that have previously been arranged in a pre-defined arrangement, e.g. butt-joint arrangement, a hidden butt joint joining the first and second components may be generated by applying laser energy to a side where only one of the component parts is visible in a plan view, for example, whilst the other component part is, at least in part along the contour where a welded seam is generated, hidden, i.e. is not directly accessible with laser energy, or in other words cannot be directly impinged with laser energy. Respective hidden butt-joints may be advantageously used for example with oven cavities of baking ovens and the like.

The welding may be conducted in such a way, in particular by applying an adequate welding power, e.g. laser welding power, to the second or first, for example the outer, side, such that the welding penetrates the first component part so as to weld the second component part at the first or second side, respectively, to the first component part along the mutually aligned contours, involving for example an end face of one of the components, and a buckling of the other component.

In embodiments, the method may comprise using a distinct feature of one of the component parts as the marking, and at least one act of determining the position of the distinct feature of only one of the two component parts, such for example metal sheet parts, by means of a detection device or measuring device.

The welding step may be controlled in dependence on the determined position of the distinct feature. In particular, the location and course of the distinct feature or contour may be determined, and a laser spot of a laser welding device may be controlled to move over one side of the component parts substantially in line with the course of the distinct feature or contour.

Within the meaning of the present invention, the term control as used in connection with the welding in particular shall involve an active, and automated control of the movement of the positioning and movement of a welding spot and/or a corresponding welding component arranged for generating the welding spot. The control may for example comprise controlling movement and/or orientation and/or focus of a laser head and/or laser optic arranged for generating the laser spot and the final laser welded joint. In particular controlling a laser beam may involve moving a laser spot along a pre-defined trajectory defined on one side of the component parts, the trajectory preferably and substantially coinciding with the detected contour.

Laser welding seams produced according to the state of the art may involve slight (in particular: small) deviations from the intended welding course, for example in the range of several tenth of a millimeter. The welding seam may deviate from its desired predetermined position and/or course due to process tolerances such as variations in the stamping process for the component parts, such as metal and/or plastic sheet parts, tolerances of the clamping technology used for the positioning and/or prefixing step, and/or tolerances of guiding a welding processing head, for example a laser welding head involving laser beam guiding.

The proposed method according to the invention makes it possible to achieve a desired quality of the welding seam in that the welding step is subject to an active position control and is controlled in dependence of the predetermined position of the marking, in particular one of the first and second contour, such as for example the distinct feature. Therefore, it is possible to compensate deviations which may affect the welding seam. In particular, it is possible to produce the welding seam at its desired predetermined position with greater accuracy, in particular also because tolerances related to the manufacture of the component parts, and correspondingly the contours, may be compensated by applying the contour-based laser control.

The proposed method in particular enables the generation of hidden butt joints, in particular for the reason that only one marking of one of the component parts to be joined needs to be determined or be visible from only one side of the component parts where the laser energy is applied for interconnecting the two component parts.

In particular only the marking detected at a first side at the first component part may be determined, and the second component part positioned at the averted, hidden, second side of the first component part may be welded to the first component part by applying welding energy from the first side so as to weld through the first material to generate a welded connection between the first and second component parts. Therefore, it is not mandatory to detect markings and/or contours on or at both component parts, easing manufacture of corresponding component parts, in turn reducing the effort and cost involved with manufacturing respective component parts of household appliances.

An advantageous embodiment of the invention may comprise that the at least two component parts, e.g. metal sheet parts, are positioned and/or prefixed, at least in part, in an overlapping manner or such that the at least two component parts, in particular metal sheet parts are positioned and/or prefixed according to a scarf joint, or a butt joint, in particular a hidden butt joint arrangement. In particular, the first and second component parts may be positioned and/or prefixed relative to each other such that the first and second contours are aligned with each other and such that the component parts in the interconnecting region may be arranged in a hidden but joint arrangement, where, with respect to a plan view of the side to which the laser energy is applied, i.e. from the point of view of the laser device, one of the contours is hidden at least in part, i.e. at least in part not visible from the plan view.

The control of the welding step by means of the marking, in embodiments comprising for example the first or second contour and/or a distinct feature, is particularly advantageous in situations where the component parts, in particular metal sheet parts, overlap, or in situations in which the component parts, in particular metal and/or plastic sheet parts, form a hidden butt joint, or are arranged in corresponding arrangements prior to welding.

According to an embodiment of the invention the welding step may include induction of welding energy into at least one of the component parts, in particular metal and/or plastic sheet parts from a first side, wherein the location and/or course (in particular also: position) of the marking, for example comprising the first or second contour and/or the distinct feature, is determined from the same first side. Detecting the marking and applying the laser energy may be carried out relative to the same side, which may ease overall manufacturing.

In accordance with embodiments, the arrangement design of the first and second component parts may be such that at least the overlapped part, e.g. the second contour of the second component part, comprising for example an end face located at a border site of the second component part, of the component part which is arranged on a second side opposite to the first side is hidden as regards the point of view of the first side or a plan view of the first side, and in particular may not be detectable or detected by the detection device or measurement device.

An overlapping configuration of the two component parts, e.g. metal and/or plastic sheet parts, may it make difficult to detect or to measure directly the position or path where the welding seam shall exactly extend. Determining or measuring the marking, e.g. the distinct feature and/or the first or second contour, from the same side as from which the welding energy is induced enables to correct and/or control the guiding or guidance of the welding step during and whilst carrying out the welding step without the necessity of direct detection or direct measurement of the position where the component parts, e.g. the sheet metal and/or plastic parts, shall be welded or melted.

Providing a precise welding seam is particularly difficult, because the spot of the laser beam has usually a diameter in a range of less than 1 millimeter. Consequently, small deviations in the clamping technology or in the pre-cut parts may cause major deviations in the resulting welding seam. By means of the invention it is possible to adjust the way of the laser beam to follow precisely a path or position where the welding seam shall extend, even if this path or position is covered by the overlapping sheet.

Further, welding energy may be provided to or at the first side, for example an outer side, of for example the first component part, from which the marking is detected, in such a way that the second component part located at the second side, for example an inner side, is welded through the material of the first component part. In particular such a welding may be efficient in closing and/or avoiding possible gaps prevailing between welded edges of the first and second component part. Such gaps may for example be caused by manufacturing and/or positioning tolerances. Further such welding is suitable for generating, by carrying out the welding process from the first side, a hidden butt joint, in which a lateral end face of the second component part located at the second side behind a welding area, in particular along the first contour, is welded as a type of butt joint with the first component part whilst the end face being hidden from the point of view of the fist side. Such hidden butt joints may be advantageous for providing smoothed surfaces at welding lines, which may be of advantage with household appliances, for example for avoiding corrosion and/or slices or chinks where debris and the like may settle.

In further embodiments the marking, e.g. the distinct feature, may be or be related to a relief feature comprised by one of the two component parts, in particular metal and/or plastic sheet parts. In variants, the relief feature may indicate or correspond to a predetermined path of a welding seam produced in the welding step. The relief feature may be integrally formed to the one of the two component parts, in particular metal and/or plastic sheet parts.

A relief feature may be useful for detecting or measuring a predetermined position, location and/or course on the one of the component parts, e.g. one of the metal and/or plastic sheet part, in a comparatively easy way. Beyond that, the location and/or course of a welding line may be defined by a relief structure, e.g. by a ridge, in particular an S-shaped or Z-shaped ridge, in particular S-shaped or Z-shaped transition area, provided in or on one of the component parts in a particular way.

According to a further embodiment of the invention the first component part, e.g. a first metal and/or plastic sheet part, may comprise the marking, e.g. distinct feature, and the second component part, e.g. a second metal and/or plastic sheet part does not comprise said marking, e.g. distinct feature, and wherein the second component part may comprise a position securing element configured to interact with the marking, e.g. the distinct feature, of the first component part to secure the position of first component part and second component part relative to each other in at least one, preferably at least two, spatial direction(s).

Thus, it may be possible in the positioning and/or prefixing step to bring the component parts in a position where a possible position securing element, such as an end face border, and the marking, e.g. in the form of a relief feature, in particular the distinct feature, may interact such that the first component part is, in its intended or predetermined position, relative to the second component part. The first and second component part may then be in proper alignment, in which the first and second contours abut against each other.

Since the marking/contour to be detected may be considered as acting as a counterpart for the position securing element, the position of the respective other component part may be assumed or estimated with comparatively high accuracy based on the marking, in particular such that it is possible to control the welding step in dependence of, in particular based on, the detected location and/or course of the marking/distinct feature/contour alone.

Specifically, it is possible to carry out the welding step by only detecting or measuring the marking/contour at or on only one side of the first component part, for example, but without detecting or measuring a marking on or at the second component part or a second side of the first component part averted from the first side. In particular, because the marking may act as, define and/or be related to a position securing element a welding seam may be obtained that is accurately provided at and in its intended position on the first component part. Further, the second component part may be accurately positioned relative to the first component part during the welding step.

As already mentioned, in a further embodiment of the invention, the position securing element may be a front end of the second component part, configured to abut on the marking, e.g. the distinct feature. The position securing element may in embodiments for example be or correspond to a diagonal section of a S-shaped or Z-shaped buckling corresponding to a S-shaped or Z-shaped contour of one of the component parts.

Thus, the first and second component parts may be brought into position in a very precise and simple way.

In a further embodiment of the invention the marking, in particular distinct feature, may be defined by a displacement structure of the first component, e.g. metal and/or plastic sheet part.

The displacement structure may be defined by a first section and a second section which are displaced, for example parallel to a surface normal of the first component, relative to each other. The value of displacement in a direction parallel to the surface normal or perpendicular to the surface of the first component, may substantially correspond to the material thickness of the first or second component part, in particular in the region or area of the marking. The first and second sections may extend parallel to each other in different, for example parallel, planes.

Thus, it is possible to provide an overlapping welding connection, such as for example comprising a hidden butt joint, having one smooth side, i.e. a side without or with no substantial step and/or gap like transitions or the like. In particular such smooth connections, in particular welding connections or welded joints, are particular suitable for providing high quality enamel coatings to the joined component parts, meaning that corresponding connections may be suitable for manufacturing oven muffles or cavities for baking ovens.

Further, an embodiment of the invention may include that the displacement structure comprises an S-like or Z-like formed section, optionally extending longitudinally substantially along the complete predetermined path of the welding seam.

S-like or Z-like formed sections may be used for easy detection or measuring the intended path of the welding line, in particular as compared to surrounding parts of the corresponding component part. Further, S-like or Z-like sections, bucklings or embossings, may be advantageous with respect to proper alignment of the two component parts.

In particular, when optical detection or optical measurement is used for detecting the location and/or course of the marking, S-like or Z-like formed sections or structures may be efficient for reliable detection and/or measurement.

According to embodiments the welding step may comprise a laser welding step, in particular a continuous laser welding step or a laser spot welding step, and/or wherein the welding step is carried out with a laser machine (in particular also: device, unit) comprising a laser head displaceable independently by linear guidings, or a laser head comprising adjustable optical components, in particular internal mirrors, for guiding the laser beam along a path defined via the marking and detected and/or measured by the detection device. The or an optical system may optionally be provided for the purpose of adjustment of the laser beam focus.

In embodiments, the welding connection may be produced in a/the laser welding step. A laser welding step benefits widely from control of the welding process dependent on the position, location and/or course of the marking, e.g. distinct feature.

In particular, it is possible to control and/or correct the guidance of the laser along the intended welding path by influencing, e.g. linear, guidings of the laser and/or optical elements, such as mirrors of the laser, based on data received from the detection of the location and/or course, in particular position, of the marking/contour, e.g. distinct feature. A welding process of high quality may be achieved.

In embodiments the act of determining the location and/or course, in particular position, of the marking/contour, e.g. distinct feature, may comprise an act of optical detection or optical measurement of the position and/or the form and/or course (in particular: pathway) of the marking/contour. In particular, there may be provided an act of optical detection or optical measurement of position parameters of at least a section of the marking related to one or more spatial directions, in particular the spatial x-direction and/or the spatial y-direction and/or the spatial z-direction.

Thus, indirect optical detection or optical measurement may be provided. It is possible, to determine the line or path where the welding connection shall be established without direct detection or measurement. However, the marking allows active position control and/or active regulation of the actual position of the welding seam, in particular welding point, and/or closed loop position control of the welding seam, in particular welding point.

In embodiments of the invention the step or act of determining the location and/or course of the marking/contour, e.g. distinct feature, may include discretely or continuously determining a position, in particular local position, of the marking on the component part, wherein the determined position corresponds to the welding point (in particular: welding spot) where the welding energy is induced during the welding step or the welding point is inferred from the determined position.

Thus, in-process detection or in-process measurement may be implemented for the welding step. The welding energy may be induced or applied in the determined position, thereby avoiding undesired deviations of the welding seam, which may be caused by process tolerances, for example. The welding energy may be applied to one side of the mutually aligned component parts whilst one of the component parts is not directly accessible by the laser, as explained in more detail above.

In further embodiments of the invention the welding step may comprise guiding of a welding head, which may be a laser welding head, along the predetermined path of the welding seam, wherein the guiding of the welding head is corrected at least in one, two or more, preferably in three, spatial directions, wherein the corrections are inferred from the determined location and/or course, in particular position or positions, of the marking, e.g. the distinct feature. The act or step of determining the location and/or course, in particular position or positions of the marking may be carried out prior to inducing or applying welding energy to the component part.

The act of determining the location and/or course, in particular position or positions, of the marking, e.g. distinct feature, may be carried out in advance to applying energy to the component part(s) for welding them together. Thus, prior to applying the energy, it may be determined where exactly the energy shall be induced in the component part(s). By this, a very efficient welding process of high quality may be achieved.

According to a further embodiment of the invention the welding step may include guiding the/a laser beam focus in dependence of the determined location and/or course, in particular position(s), of the marking, e.g. distinct feature, in the direction of propagation of the laser beam.

It may be particularly advantageous to control the laser beam focus in dependence on a determined level or height position of the marking/contour, e.g. distinct feature. Tolerances incurred from bulging or unevenness of the component part, such as a sheet metal part, comprising the marking/contour, e.g. distinct feature, may be compensated in that the laser beam focus is controlled along the direction of propagation of the laser beam. In particular, possible lateral deviations from the intended welding path may be corrected based on the determined location and/or course, in particular position.

In a further embodiment of the invention, the act of optical detection or optical measurement may comprise at least one of the steps of:
  recording of detection data or measurement data based on a triangulation principle or based on grey level interpretation;
  transferring the recorded data to a calculation unit;
  calculating the location and/or course, in particular position(s), of the marking/contour, e.g. distinct feature, in particular by the calculation unit; and
  using the calculated location and/or course of the marking/contour for positioning and guiding a laser spot along a determined path corresponding to the marking/contour during the generation of the welded seam.

For example, for generating the welded joint, the laser spot may be controlled so as to be guided or moved along a trajectory substantially corresponding to the calculated or determined location and course of the marking/contour.

Using triangulation principle or grey level interpretation enables reliable calculation of the location and/or course, in particular position, of the marking, e.g. distinct feature.

In a further embodiment of the invention the method may comprise at least one enameling step carried out for enameling, at least in part, the two component parts, in particular metal sheet parts. The two component parts, in particular the two sheet metal parts, may be enameled at least on the side that averted from the side into which the welding energy was induced.

Thus, a smooth and even surface may be created to serve e.g. as the surface of the interior of an oven muffle.

The object of the invention is also achieved by a domestic appliance being manufactured according to the invention, in particular comprising an oven muffle of for example a baking oven, or a treatment chamber of a refrigerator, dishwasher, or washing machine, such as a washer drum, and the like, manufactured according to the invention. As mentioned, the component parts in the mounted condition may represent a cavity for a household appliance, in particular domestic household appliance, the cavity being for example an oven muffle of a baking oven and similar.

The invention is also based on the finding, that components of household appliances, such as oven muffles and other components defining cavities with household appliances, composed from at least two component parts, may be manufactured by using the method as proposed herein, in particular involving a step of detecting (in particular: tracking) a location and/or course of a marking provided on only one of the component parts, and welding the components parts together by controlling application of the welding energy based on the detected location and/or course of the marking. Specifically, hidden butt joints may be generated by using the proposed method.

The method as proposed herein may in embodiments comprise a step of generating a marking on (only) one of two or more component parts, the marking optionally being implemented as kink, bend, buckling, bead, rip and the like, and using the marking for controlling location and/or course of a for example welded joint between the component parts. As markings structural elements of respective component parts may be used, such as for example bents connection interfaces and the like.

Novel and inventive features of the present invention are set forth in the appended claims.

The present invention will be described in further detail with reference to the drawings, in which FIG. 1A and FIG. 1B illustrate side views of an oven muffle each comprising a welding connection produced according to the state of the art, wherein FIG. 1B illustrates a situation comprising a deviation from the ordinary target condition;

In general, oven muffles are known in the art which comprise separate muffle parts of for example sheet metal parts welded to each other. One of the sheet metal parts may comprise a portion formed by an S-like or Z-like displacement and wherein the other sheet metal part is arranged with a front end thereof adjacent to a transition surface of the S-like or Z-like displacement. A section of the S-like or Z-like displacement, for example a kind of step defined by the S-like or Z-like displacement, may be used as an abutment face or surface for the other sheet metal part.

As an example, an end face at the border side of one of the sheet metal parts may abut a corresponding face side of the step. The corresponding face side may define a stop face or surface suitable properly position the two sheet metal parts against each other.

In a welding step, the two sheet metal parts may be welded in the region where transition surface and front end are arranged. The transition surface, for example providing a step or contour, involving one or more linear and/or curved contour lines, may be used as a marking where a welding seam, intended for welding together the two sheet metal parts, shall be provided.

Figure 1A:
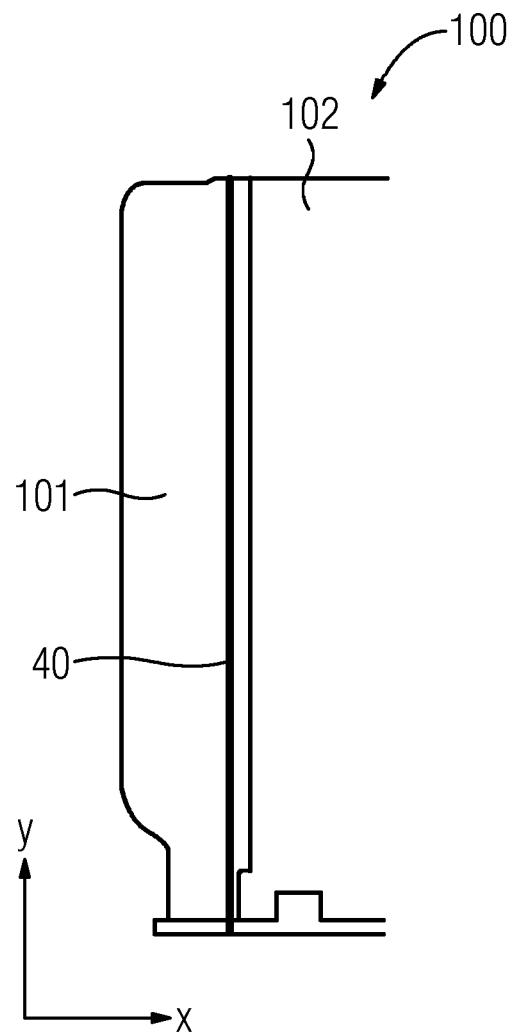
Figure 1B:
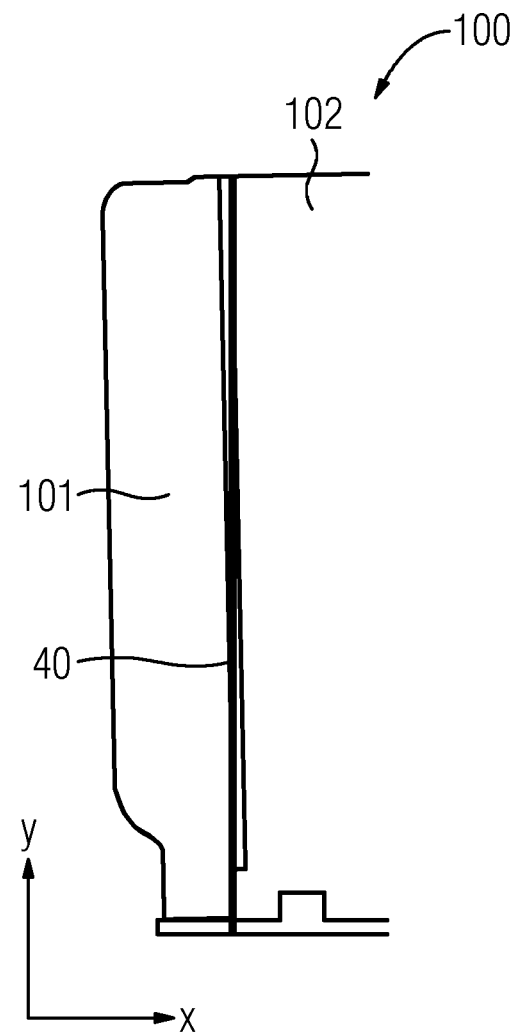

FIG. 1A and FIG. 1B illustrate an oven muffle 100 having a muffle top part 101 and a muffle side wall 102 connected to each other by a welding seam 40. FIG. 1A illustrates a welding seam properly positioned, wherein FIG. 1B illustrates a welding seam produced with the welding process, but being displaced from its predetermined position. Such deviations or failures may occur in the welding process due to small process deviations related to process tolerances, e.g. due to inaccuracies in the stamping processes for stamping the muffle parts 101, 102, inaccuracies of the clamping devices used for prefixing the muffle parts 101, 102 in the welding process or inaccuracies of the beam guidance.

It shall be noticed that FIG. 1A and FIG. 1B is provided for illustrative purposes. In particular, in reality the deviations shown in FIG. 1B may be much smaller or may not be visible for a naked eye.

Figure 2:
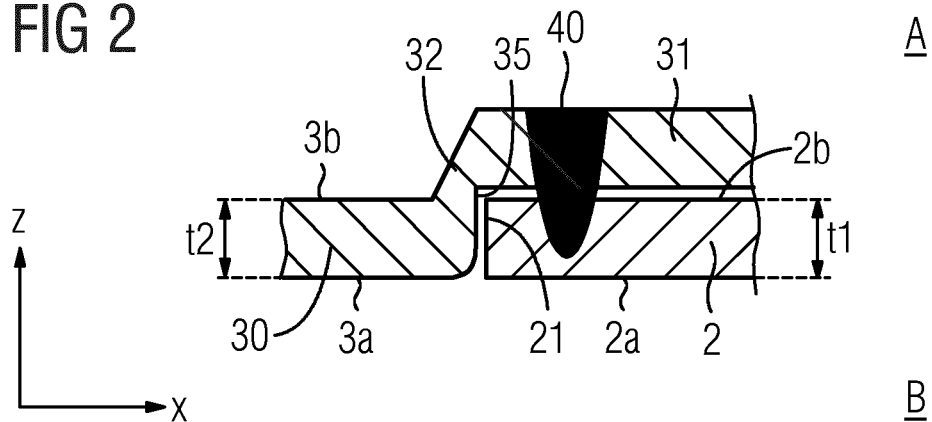
FIG. 2 illustrates a sectional view of a prior art welding connection.
Figure 4:
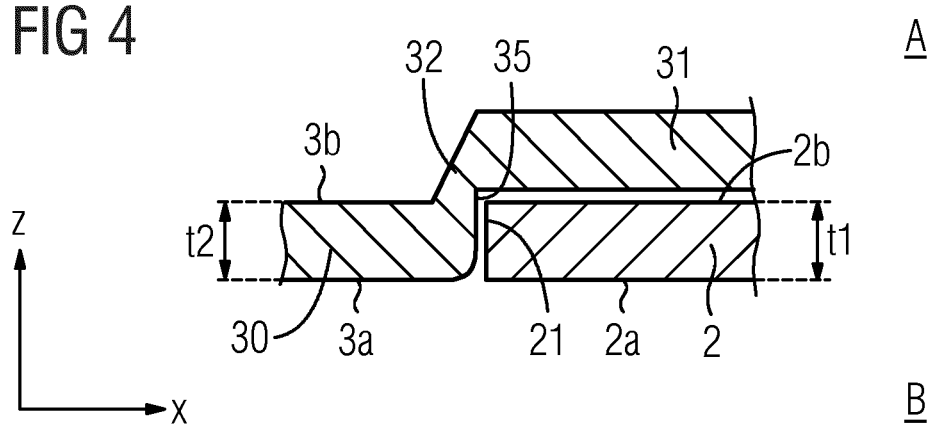
FIG. 4 illustrates a sectional view of two metal sheet parts arranged flush and in an overlapping manner.

FIG. 2 illustrates a sectional view of a welding connection interconnecting a first sheet metal part 3 and a second sheet metal part 2. FIG. 4 illustrates the configuration of the first and second sheet metal parts 2, 3 before the welding step is performed. The illustrated welding connection may be part of an oven muffle 1, wherein A indicates the outer side or exterior side of the oven muffle 100 and wherein B indicates the inner side or interior side.

A front end 21 of second sheet metal part 2 is positioned adjacent or in contact to a transition surface 35 of the S-like or Z-like formed section 32 of a first sheet metal part 3, wherein first and second sheet metal parts 3, 2, are arranged in an overlapping configuration. The welding seam 40 is arranged distant from the front end 21 and the transition surface 35 in an overlapping region of the first and second sheet metal parts 2, 3.

Since the S-like or Z-like formed section 32, representing a kind of step allowing a butt joint connection between the first and second sheet metal parts 3, 2, is produced in a bending or stamping process. Thus, in the contact zone between transition surface 35 and front end 21, a pocket or cavity may be formed. It may be desired to avoid such a pocket or cavity, in particular in the case that the surfaces 3a, 2a of first and second metal sheet part 3, 2 shall be enameled on the interior side B after the welding step.

Figure 3:
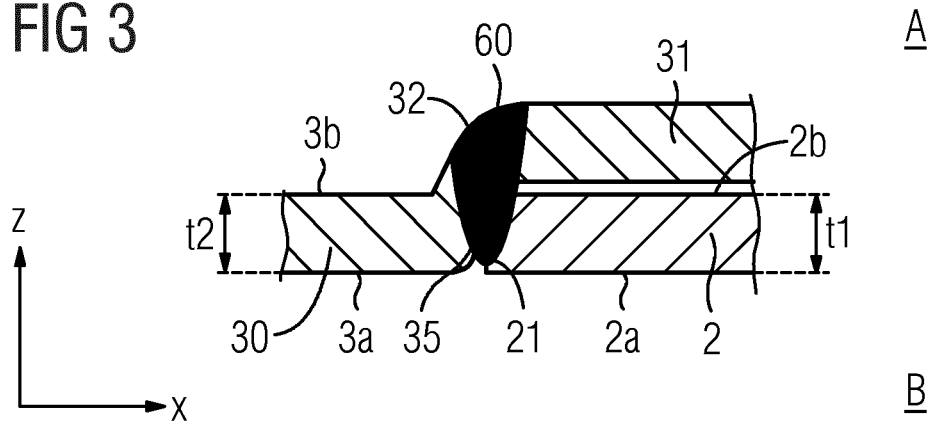
FIG. 3 illustrates a sectional view of a different welding connection produced according to the invention.

FIG. 3 illustrates sheet metal parts 2, 3 in the same configuration as in FIG. 2. However, the welding seam 60 is positioned in such way that front end 21 and transition surface 35 are melted at least partially, resulting in that the welding seam 60 is solidified in the contact zone between transition surface 35 and front end 21.

Regarding FIG. 1A and FIG. 1B, in FIG. 1A the welding seam would have the cross section as shown in FIG. 2 or FIG. 3. It is desired to achieve a welding seam according to FIG. 1A having a cross section as shown in FIG. 2 or FIG. 3 substantially unvarying along its longitudinal extension.

It is not desired, as shown in FIG. 1B, that the welding seam 40, 60 varies between the cross section as shown in FIG. 2 and the cross section as shown in FIG. 3 or, even worse, would vary to a very different cross section.

In the welding process, the sheet metal parts 2, 3 are arranged in the way as shown in FIG. 4 in an overlapping manner, wherein transition surface 35 and front end 21 form a butt joint as shown in FIG. 3.

The laser beam for inducing the welding energy is directed towards the intended position of the welding seam from side A, i.e. from that side from which the joint itself or the front end 21 is not visible.

In the case of welding muffle parts or an oven muffle, it may be necessary to weld the welding connection from the exterior side A due to restrictions based on small available space on the interior side B or on the clamping technology used to prefix the muffle parts.

Therefore, the laser welding process may comprise an act of discretely or continuously optical detection or measuring of the S-like or Z-like formed section 32, and/or a marking defined by them, from the exterior side A, i. e. the same side from which the laser welding energy is induced. The act of optically detecting the S-like or Z-like structure allows identifying the exact location and/or course, in particular position, of the S-like or Z-like structure on the first sheet metal part 3.

The clamping process for prefixing the overlapped first and second sheet metal parts 2, 3 secures that the front end 21 is in contact or adjacent to transition surface 35. Thus, from detection or measuring of the position of S-like or Z-like section 32, the position of front end 21 of the second metal sheet part 2 is assumed.

The position parameters generated in the act of optically detecting or measuring are recorded or transferred to a control unit that may be part of the laser welding machine.

The control unit may be configured to control the laser spot of the laser welding machine dependent on these position parameters as defined by the S-like or Z-like section 32, in particular a corresponding marking.

With respect to position parameters related to x and y directions, linear guidings operably coupled to the laser head, e.g. linear axes independent from each other may be controlled by the control unit to adjust the proper position of the laser beam and as a consequence thereof of the resulting welding seam.

With respect to position parameters related to a z direction, the control unit may control the laser focus, in particular position and movement of the laser focus along the component part, directly in accordance with for example a linear guiding of the laser head in z-direction.

It may be advantageous if the z direction corresponds to the direction of the laser beam propagation and/or if the laser beam propagates perpendicular to the planar surfaces 3b of metal sheet part 3. Alternatively or additionally, it is possible to use scanner optics, comprising remotely adjustable mirrors which can be adjusted by the control unit to lead the laser beam in x and/or y and/or z direction.

The act of optical detection or measuring can be performed by an optical detection unit arranged coaxially around the laser beam optic or by an optical detection unit being arranged distanced to the laser beam optic. The act of optical detection or optical measurement may be based on a triangulation principle or on grey level interpretation.

Figure 5:
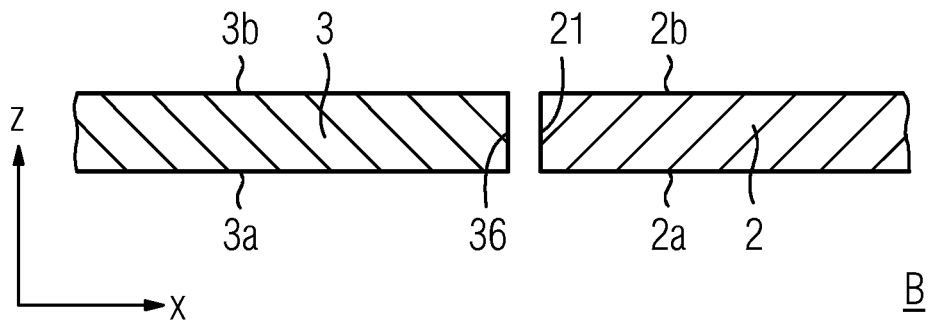
FIG. 5 illustrates a sectional view of two metal sheet parts configured in a butt joint.

FIG. 5 illustrates a configuration of the first and second sheet metal parts 2, 3 in a butt joint before the welding step is performed. The butt joint in FIG. 5 differs from that in FIG. 3 and FIG. 4 in that the butt joint in FIG. 3 and FIG. 4 is a hidden butt joint, meaning that the second metal sheet part 2 is not visible from the outer side A. However, generating the welded seam similarly may be conducted by detecting and/or measuring only a marking of or on only one of the metal sheet parts 2, 3. Implementing such butt joints in particular has proven advantageous in view of manufacturing effort and/or stability in case that an oven cavity of a U- or C-type configuration, which are described in further detail below, is manufactured.

The first and second sheet metal parts 2, 3 in FIG. 5 are arranged in a manner that the front end 21 of the first metal sheet part 3 and a front end of the second metal sheet part 2 are arranged adjacent to each other or in contact to each other, respectively. The front ends 21, 36 are right angled relative to the surfaces 3a, 3b or 2a, 2b of the first and second metal sheet parts 3, 2. One of the metal sheet parts 2, 3 may comprise a distinct feature, such as a marking, in particular defined by a particular contour and the like, e.g. an upper edge of the first metal sheet part 3, to be used for controlling the welding step, in particular for controlling the location of a laser spot used for welding together the two metal sheet parts 2, 3.

By the welding step, the welding seam is produced in the regions of the first and second metal sheet parts 3, 2 facing each other thereby generating the butt joint, wherein, as discussed, movement of the laser spot used for welding is controlled during the welding process based on detected and/or measured location and/or course, in particular position, of the marking or distinct feature.

Figure 6:
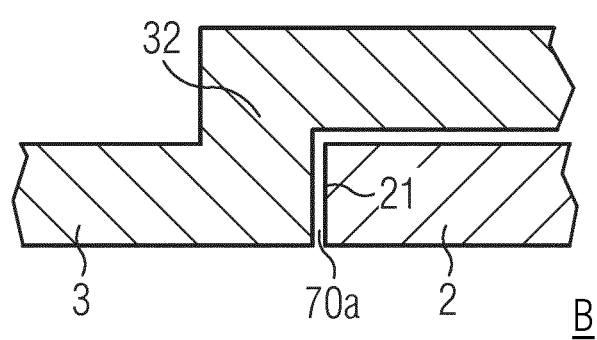
FIG. 6 illustrates a variant of a welding connection as compared to FIG. 3 and FIG. 4.

FIG. 6 illustrates a variant of a welding connection as compared to FIG. 3 and FIG. 4, wherein the S-like or Z-like formed section 32 is implemented as a step having, in contrast to the example in FIG. 3 and FIG. 4 no inclined section at the outer side A. Using the inclined course of the section 32 at the outer side has the advantage that a comparatively smooth transition from the first sheet metal part 3 to the second sheet metal part may be obtained. However, the method as referred to herein is also suitable for more significant stepped structured avoiding inclined transition sections or passages.

Similar as with the example given in FIG. 3 and FIG. 4, applying the laser energy from the outer side, whilst using the detected location and/or course of the step 32 for controlling path of the laser focus on the first sheet metal part 3 at the outer side A is suitable for obtaining a welded joint in which a gap 70a between the first sheet metal part 3 and the second sheet metal part 2 in the region where these parts mutually abut, may be substantially, in particular fully, closed by laser welding.

For example, gaps of several tenth of a millimeter, for example between 1 to 2 tenth of a millimetre, may be closed by means of the welding. Thus, a smooth surface, i.e. a surface substantially free from gaps in the joining region, may be obtained for example at the side averted from the side where the laser energy is applied.

Figure 7:
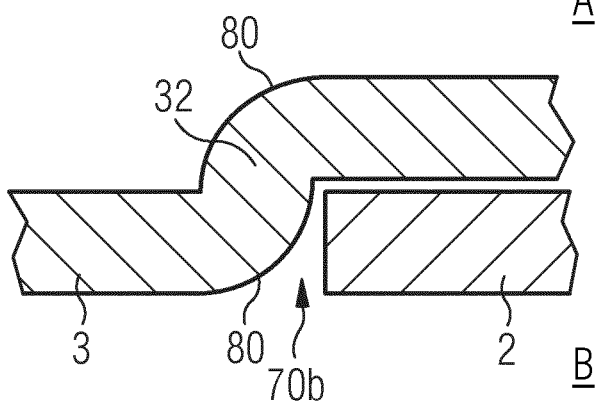
FIG. 7 illustrates a further variant of a welding connection as compared to FIG. 3, FIG. 4, and FIG. 6.

FIG. 7 illustrates a further variant of a welding connection as compared to FIG. 3, FIG. 4, and FIG. 6. The connection in the example of FIG. 7 comprises an S-like or Z-like formed section 32, in the form of an S-shaped step transition, in which the edges 80 of the step transition are smoothed or rounded, which may for example be dependent on the way how the step transition is generated. However, even if gap 70b is somewhat larger than the gaps as shown in FIG. 3, 4, 6, the proposed welding process may be controlled in dependence of the location and/or course of the step transition, or a corresponding marking, such that the gap 80 can substantially be filled by welding the first 3 and second metal sheet parts together.

In particular, being able to conduct the welding process in such a way that gaps between the first 3 and second sheet metal part 2 can substantially be filled, has the advantage that smooth surfaces in the transition region between the sheet metal parts 2, 3 may be obtained, which in turn is effective for obtaining smooth enamel-coated surfaces.

It shall be noted that also other forms and/or contours of the transition region between the metal sheet parts may be used in connection with the proposed method, wherein any contour of such transition may be used as a marking representative of or for the path of the welded joint to be generated.

Thus, the proposed method for manufacturing a domestic appliance, in particular for manufacturing a particular component of a domestic appliance, such as for example a cavity or chamber, in particular oven cavity of a baking and/or microwave oven, is effective for obtaining smooth transitions between welded component parts.

The method in particular involves at least one positioning and/or prefixing step comprising positioning and/or prefixing of at least a first component part, such as the first sheet metal part 3, relative to at least a second component part, such as the second sheet metal part 2. The first component part 3 may comprise a first contour 32, such as the S-like or Z-like formed section, and the second component part 2 may comprise a matching second contour 21, such as the front end.

The positioning and/or prefixing may comprise positioning and/or prefixing the second contour 21 at the first contour 32, in particular in such a way that the first component part 3 and the second component part 2 are aligned relative to each other in a predefined manner. In particular, the first contour 32 may function as or define a contact edge for abutting the second contour 21 in a particular manner.

For example, the first contour may have a Z-shaped cross section with two legs, e.g. the first and second sections 30, 31, interconnected by a transition section. The first contour may be shaped such that the second contour 21 may be abutted to a transition surface 35 of the first component part 3 located on one particular side, e.g. the inner side B, for example such that the second component part 2, for example in the region of the second contour 21 thereof, is flush with a first leg, e.g. the first section 30, whilst the second leg 31 overlaps the second component part 2 in the region of the second contour 21 by a predefined length.

Having abutted the second component part 2, more particularly the second contour 21 at the first component part 3, specifically at the first contour 32, the two component parts may be welded together in a welding step, which may comprise the generation of at least one welding seam 40, 60.

The welding step may comprise welding together the first 3 and second component part 2 along at least one of the first 32 and second contour 21, wherein the welding is controlled by a control device, such as a controller so as to:
  detect, in particular via a detection device, at least one of a location and course of at least a section of a marking representative for the first contour 32, wherein the first contour 32 may be used as the marking; and
  generate a welded seam 40 to join the first 3 and second component 2 along the first 32 and second contour 21 based on the detected location and/or course of the marking.

In case that the first contour 32 has a Z-shaped cross section, and that one of the legs 30, 31 overlaps and covers the second contour 21, the welding may involve generating a welding seam between the first 3 and second component part 2 by applying welding energy, e.g. laser energy, to the first component part 3 at a side or section overlapping and/or covering the first contour, in particular such that gaps 70a, 70b prevailing between the first 32 and second contour 21 are substantially closed by appropriately fusing the first 3 and second component part 2 during welding.

In the following, some examples for oven cavities that may be manufactured by using the method as proposed herein are provided:

For each of the following oven cavities, reference is made to a bottom side G, a top side T, a rear side R, and front side F, wherein each cavity comprises two lateral sides L. In the figures, the defined sides are also used for designate respective walls of the cavities.

Figure 8:
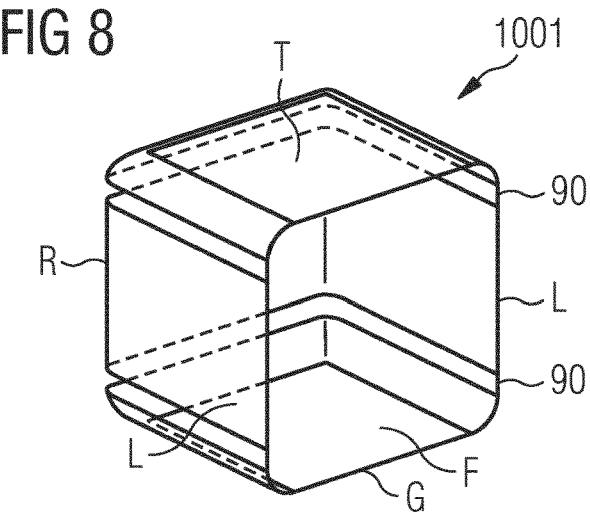
FIG. 8 illustrates a first configuration of an oven muffle manufactured in accordance with a method as proposed herein.

FIG. 8 illustrates a first configuration of a first oven muffle 1001 manufactured in accordance with a method as proposed herein. The first oven muffle may be called a C-cavity and comprises a bottom wall G which has the shape of a half-shell framed or rimmed at three sides, i.e. the rear and the two lateral sides, whilst open at the front F. The top wall T has a similar configuration and is placed symmetrically with respect to the bottom wall G.

The side walls L and the rear wall R before interconnecting the cavity parts represent a single component part that is bent accordingly to be in the shape of a C. The component parts of the first oven muffle 1001 may be joined together via two connecting joints 90 running along the rims or contact faces between the bottom wall G and the lower side of the rear R and side walls L, and between the top wall T and the upper side of the rear R and side walls L. Each of the connecting joints may involve a welding connection comprising a hidden butt joint as shown and described in detail in connection with FIG. 3, 4, 6, 7 or a butt joint as described in detail in connection with FIG. 5. Thus, for manufacturing the C-cavity as shown in FIG. 8 two welded seams, which may comprise several partial welded seams, may be generated by applying laser energy to the outer side of the cavity walls to thereby weld together overlapping and/or abutting sections of mutually abutting contours of the cavity walls. In the present example, a corresponding method may involve the generation of two welded seams based on a detected location and/or course of a Z-shaped contact section provided either along the upper/lower rim of the bottom G or top wall, or along the upper/lower rim of the C-shaped cavity middle section defined by the lateral L and rear wall R. Regarding the Z-shaped contact section, reference is made to the description above.

Figure 9:
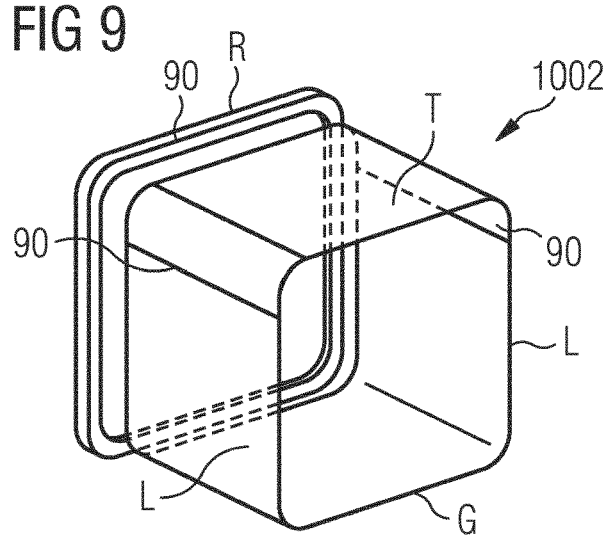
FIG. 9 illustrates a second configuration of an oven muffle manufactured in accordance with a method as proposed herein.

FIG. 9 illustrates a second configuration of a second oven muffle manufactured in accordance with a method as proposed herein. The second oven muffle 1002 may be designated a U-cavity, as the bottom wall G and the side-walls L, before interconnecting the cavity parts, are represented by a single piece of material which bent such that a U-shaped cross section is obtained. In the shown example, the rims of the top wall T extending towards the bottom wall G are comparatively short, whereas the rims extending from the bottom wall G, i.e. the side walls L, raise up over nearly the whole lateral sides. In the example, the bottom G and lateral walls L define a single component part, and also the top wall T may be considered as a separate component part.

Welded joints as described herein are formed as linear welded seams running from back R to front F or front F to back B substantially at the connecting joints 90 between the lateral walls L and the top wall T. The welded joints may comprise a hidden butt joint, or a butt joint as described herein.

With the second oven muffle 1002, or oven cavity 1002, the rear wall R may be a separate component part that may be welded to the bottom G, top T and lateral walls L, wherein the rear wall R may be joined to the other component parts by a circumferential welded joint involving one of a hidden butt joint or a butt joint as described herein and generated in accordance with a method as proposed herein, in particular by applying laser welding from the outer side of the oven muffle 1002, for example at a hidden but joint section. The welded joint for fixing the rear wall R may comprise four straight sections running along the edges of the cavity and four curved sections at the corners. The welded joint may be generated by detecting the location and/or course of the edges and corners, and controlling a laser head applying laser energy from the outside to a section of overlap between the rear wall R and each of the bottom G, top T and lateral walls L in dependence of the detected location and/or course, in particular by controlling the path of a corresponding laser spot in dependence of the detected edge/corner.

Figure 10:
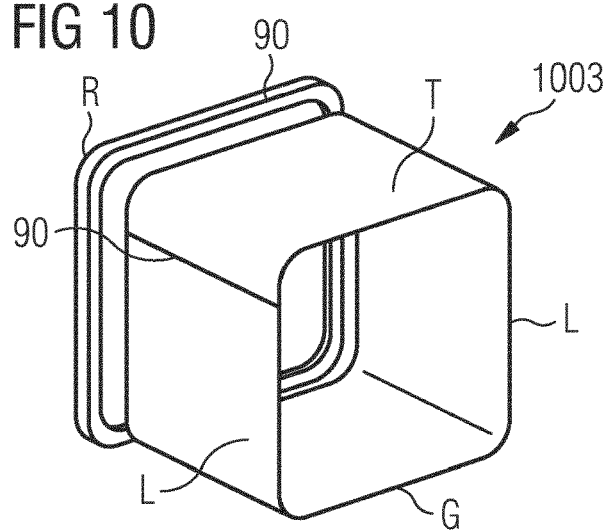
FIG. 10 illustrates a third configuration of an oven muffle manufactured in accordance with a method as proposed herein.

FIG. 10 illustrates a third configuration of a third oven muffle 1003 manufactured in accordance with a method as proposed herein. The third oven muffle 1003 may be called an O-cavity, because the bottom G, lateral L and top walls T may be made from a single sheet metal part, bended to have a substantially rectangular cross section and welded together at a single connecting joint 90. The connection joint may be generated in accordance with a method as described herein. In the configuration of the third oven cavity, only a single welded joint 90 is required for the component part comprising the bottom G, top T and side walls, thereby being able to reduce manufacturing effort and cost. The rear wall may be fixed to the other component parts as described in connection with the second oven muffle 1002.

Each of the welded joints or at least some of the welded joints used for manufacturing the oven muffle may comprise a hidden butt joint or butt joint as described herein, wherein the generation of the welded joints may be based on the detection of a marking visible or detectable from the outer side of the oven muffle and indicative of location and/or course of the welded joint.

Figure 11:
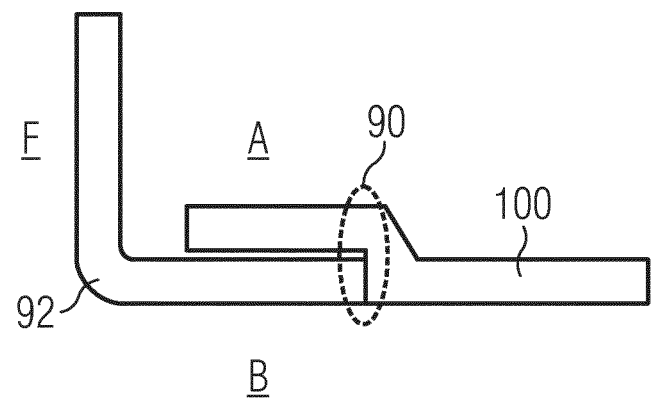
FIG. 11 illustrates a detail of a welded joint provided with an oven muffle.
Figure 12:
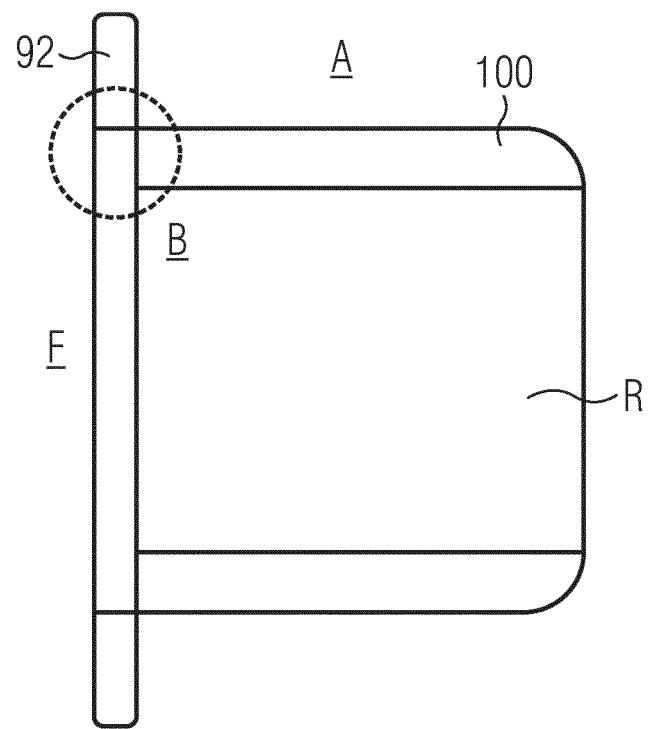
FIG. 12 illustrates an oven muffle comprising a front frame welded to the muffle walls by using a method as proposed herein.

FIG. 11 illustrates a detail of a welded joint provided with an oven muffle, and FIG. 12 illustrates an oven muffle comprising a front frame 92 welded to the muffle walls depicted by reference sign 100 by using a method as proposed herein.

More specifically, the front frame 92 as a separate component part is welded to the muffle walls 100, wherein a hidden butt joint 90 may be generated by applying laser energy to the outer side of the cavity 100 in a circumferential transition area provided at the front side F of the muffle walls and having a Z-shaped cross section.

The front frame 92 comprises an angled or bent, in particular L-shaped cross section, designed in such a way that one flanged leg of the front frame 92 can engage the Z-shaped transition area. The engagement is such that an end face of the flanged leg of the front frame 92 may be positioned to abut at an inner step of the Z-shaped transition area whilst overlapping with an outer rim of the transition area.

The Z-shaped transition area, in particular a contour apparent at the outer side A may be detected via a detection device, in particular using optical detection, and the contour may be used for guiding a laser spot for welding the front frame 92 to the muffle walls 100 in accordance with the detected contour to generate a welded seam with a predefined location and course at the Z-shaped transition area.

An edge or curvature or inclined section of the transition area may be used as the detected contour representative of a marking for location and course of the intended welded seam.

Laser energy may be applied to or at the outer side A of the muffle walls 100 in such a way that gaps prevailing between the front frame 92 and cavity walls 100 at the inner side B are substantially closed. Thus, a smooth and even surface in particular suitable for enamel coating may be obtained.

As can be seen, an oven cavity may be manufactured from several component parts comprising a bottom wall G, top wall T, lateral walls L, a rear wall R, and/or a front frame 92, wherein the component parts may be joined together by welded joints generated in accordance with the method as describe herein, in particular by generating and using a marking on one or more of the component parts at a side corresponding to the outer side of the oven muffle, the marking representative of location and/or course of the welded joint.

LIST OF REFERENCE NUMERALS

2 second sheet metal part
2a first surface of second sheet metal part
2b second surface of second sheet metal part
21 front end
3 first sheet metal part
3a first surface of first sheet metal part
3b second surface of first sheet metal part
30 first section
31 second section
32 S-like or Z-like formed section
35 transition surface
36 right angle front end of first sheet metal part part
40, 60 welding seam
70a, 70b gap
80 edge
90 connecting joint
92 front frame
100 oven muffle
1001 fist oven muffle
1002 second oven muffle
1003 third oven muffle
101 muffle top part
102 muffle side wall
A outer side
B inner side
G bottom
T top
B back
F front
L lateral
x, y, z directions
$t_1$, $t_2$ material thickness

The invention claimed is:

1. A method for manufacturing a domestic appliance comprising the following steps:
   positioning and/or prefixing of a first component part of the domestic appliance relative to a second component part of the domestic appliance in an overlapping manner, thereby at least partially defining a cavity of the appliance,
   the first component part comprising a first contour, and the second component part comprising a matching second contour, respectively, the positioning and/or prefixing comprising positioning and/or prefixing the second contour in a pre-defined arrangement at the first contour;
   welding together the first and second component parts along at least one of the first and second contours by applying welding energy to an outer surface of the cavity;
   the welding being controlled by a control device and carried out by:
   detecting at least one of a location and course of a marking representative for only one of the first and the second contour; and
   generating a welded seam to join the first and second components along the first and second contours based on the detected location and/or course of the marking.

2. The method according to claim 1, wherein the first and second component parts respectively comprise at least one metal and/or plastic sheet parts, and/or wherein the positioning and/or prefixing comprises: positioning and/or prefixing the first and second component parts such that the first and second component parts are positioned and/or prefixed in a scarf joint, or in a butt joint, or in a hidden but joint arrangement.

3. The method according to claim 1, wherein the welding step includes induction of the welding energy into at least one of the first and second component parts from a first side, wherein the at least one of the location and course of the marking is determined from the same first side, wherein an overlapped part of one of the component parts which is arranged on a second side opposite to the first side is hidden as regards a point of view from the first side.

4. The method according to claim 1, wherein the marking is or is related to a relief feature comprised by one of the component parts, the relief feature being formed integrally to said one of the two component parts.

5. The method according to claim 1, wherein the first component part comprises the marking and the second component part does not comprise said marking, and wherein the second component part comprises a position securing element configured to interact with the marking of the first component part to secure positions of the first component part and the second component part relative to each other in at least one spatial direction.

6. The method according to claim 5, wherein the position securing element is implemented as a front end of the second component part, configured to abut on or at the marking.

7. The method according to claim 5, wherein the marking is a displacement structure of the first component part, wherein the displacement structure is defined by a first section and a second section which are displaced relative to each other by a value corresponding substantially to a material thickness of the first or second component part, the first and second sections extending parallel to each other in different planes.

8. The method according to claim 1, wherein the welding step is a continuous laser welding step or a laser spot welding step, and/or wherein the welding step is carried out with a laser machine, the laser machine comprising a laser head displaceable independently by linear guidings or a laser head comprising adjustable optical components, for guiding the laser beam along a path defined via the marking and detected and/or measured by the detection device.

9. The method according to claim 1, wherein determining the location and/or course of the marking comprises an act of optical detection or optical measurement of position parameters of at least a section of the marking related to one or more spatial directions.

10. The method according to claim 1, wherein determining the location and/or course of the marking includes discretely or continuously determining a position of the marking on the corresponding component part, wherein the determined position corresponds to a welding point where the welding energy is induced during the welding step, or the welding point is inferred from the determined position.

11. The method according to claim 1, wherein the welding step comprises guiding of a welding head along a predetermined path of the welded seam wherein the guiding of the welding head is corrected at least in one spatial direction, the corrections inferred from the detected location and/or course of the marking, wherein determining the location and/or course of the marking is carried out prior to applying the welding energy to the component part.

12. The method according to claim 8, wherein the welding step includes guiding a laser beam focus in dependence on the determined location and/or course of the marking in a direction of propagation of the laser beam.

13. The method according to claim 9, wherein the act of optical detection or optical measurement comprises at least one of the steps of:
   recording of detection data or measurement data based on a triangulation principle or based on grey level interpretation;
   transferring the recorded data to a calculation unit;
   calculating the location and/or course of the marking; and
   using the calculated location and/or course of the marking for positioning a laser spot during the generation of the welded seam.

14. The method according to claim 1, further comprising:
   enameling the two component parts at least on a second side averted from a first side into which the welding energy was induced during the welding step.

15. A domestic appliance comprising an oven muffle or a treatment chamber or a washer drum manufactured according to the method according to claim 1.

16. The method according to claim 7, wherein the displacement structure comprises a S-like or Z-like formed section extending longitudinally substantially along a complete predetermined path of the welded seam.

17. A method for manufacturing a cavity of a domestic appliance, comprising:
   positioning a first abutting surface of a first sheet-like part and a second abutting surface of a second sheet-like part in abutting arrangement, thereby at least partially defining said cavity having an inner surface comprising respective inner surfaces of the first and second sheet-like parts and an outer surface comprising respective outer surfaces of the first and second sheet-like parts, said first abutting surface defining a first contour and said second abutting surface defining a second contour complementary to the first contour;
   optically detecting a location and a course of a marking on the outer surface of said first sheet-like part that is indicative of a proper location and course of a weld seam for joining said first and second sheet-like parts;

laser-welding together the first and second sheet-like parts by applying welding energy to the outer surface of the cavity in the form of a laser spot and controlling a location and a course of said laser spot applied to the outer surface of said cavity in dependence on the detected location and course of said marking, in order to yield a weld joint that defines a flush, smooth transition between the first and second sheet-like parts at the inner surface of the cavity; and applying an enamel-coating on the inner surface of the cavity over the first and second sheet-like parts and over said weld joint therebetween.

18. The method according to claim 17, said first abutting surface comprising a transition surface of an S- or Z-shaped section of the first sheet-like part, said second abutting surface comprising an end of the second sheet-like part, said marking comprising a feature of the S- or Z-shaped section of the first sheet-like part optically perceptible on the outer surface of the first sheet-like part.

19. The method according to claim 18, wherein a gap is formed between said first and second abutting surfaces upon abutment thereof, and wherein said weld joint formed via application of said welding energy to the outer surface of the cavity substantially closes said gap.

20. The method according to claim 18, said first sheet-like part comprising first and second legs extending from opposite ends of said transition surface of the S- or Z-shaped section, said second leg of the first sheet-like part overlapping the outer surface of said second sheet-like part when said first and second abutting surfaces are in said abutting arrangement, said welding energy being applied to the outer surface of said first sheet-like part on said second leg thereof such that a portion of said energy travels through said second leg and into said second sheet-like part in order to join them together and yield said weld seam.

* * * * *